Figure 1:
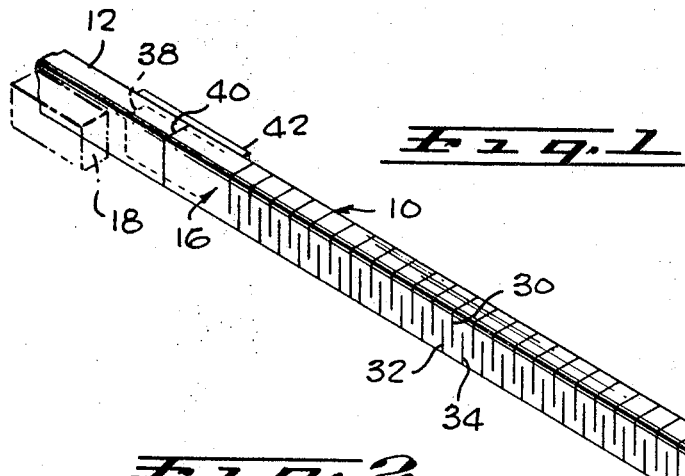

United States Patent

[11] 3,576,957

| [72] | Inventor | Arnold Tustin<br>Tring, England |
|------|----------|--------------------------------|
| [21] | Appl. No. | 797,028 |
| [22] | Filed | Feb. 6, 1969 |
| [45] | Patented | May 4, 1971 |
| [73] | Assignee | British Railways Board<br>London, England |

[54] PANTOGRAPHS
11 Claims, 7 Drawing Figs.

[52] U.S. Cl. .................................................. 191/60.3
[51] Int. Cl. .................................................. B60l 5/08
[50] Field of Search ........................................ 191/59,
59.1, 64, 65, 50, 60.3

[56] References Cited
UNITED STATES PATENTS
1,837,436 12/1931 Holland ........................ 191/64X
3,349,197 10/1967 Scheidecker ................. 191/67

FOREIGN PATENTS
1,392,692 12/1965 France .......................... 191/64
1,155,640 12/1957 France .......................... 191/67

Primary Examiner—Arthur L. La Point
Assistant Examiner—George H. Libman
Attorney—Shoemaker & Mattare ABSTRACT: This invention provides an arrangement for the supply of electric current to vehicles, which includes a servosystem providing compensation for inertial forces so as to maintain a contact member in electrically conductive connection with a conductor extending along the length of a track along which a vehicle runs. The servosystem includes a slug whose inertia is utilized to effect variation of the pressure of a fluid acting on a piston in a cylinder so as to cause the pressure of such fluid on said piston to vary in a manner which includes a component proportional to upward and downward accelerations of the contact member and in the same sense.

PATENTED MAY 4 1971 3,576,957

SHEET 1 OF 2

LESTER G. JANZOW
RONALD D. LIPKE
INVENTORS

BY
Lindenberg & Freilich
ATTORNEYS

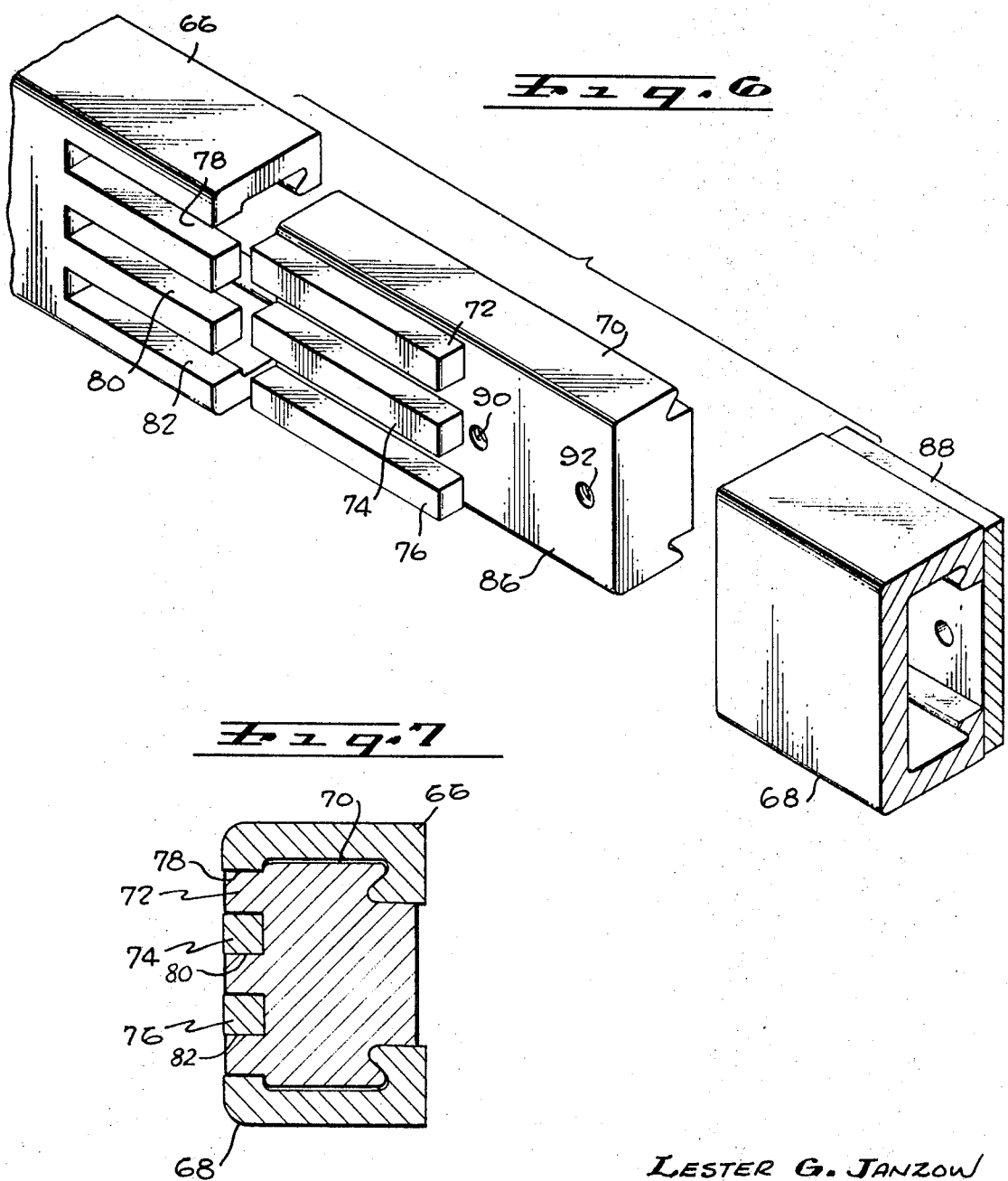

3,576,957

PANTOGRAPHS

This invention relates to means for the conduction of electric current through sliding contacts from conductors extending along the track to supply power to vehicles, particularly to railway vehicles.

In the most usual arrangement in which the conductor is a wire extending above the track the part making contact with the conductor, together with the structure which connects it with the vehicle, is commonly referred to as the pantograph, and the structure is arranged, by the use of suitable links and pivots, so that electrically conductive engagement may be maintained by varying the height of the contact head relative to the vehicle as the height of the overhead conductor varies relative to the track, and so that the head may be withdrawn when required. The pantograph consists of the contact head embodying the actual contacts that slide along the overhead conductor, and the remaining parts which carry the contact head, which will be referred to collectively as the frame of the pantograph.

The invention relates to the provision of power-operated means, such as a fluid-operated piston, by which upward force on the contact head may be provided and regulated.

Broadly stated the invention provides a pantograph installation including a servosystem providing compensation for inertial forces so as to maintain the contact member of the pantograph in electrically conductive connection with an overhead conductor, the servosystem including a slug whose inertia is utilized to effect variation of the pressure of a fluid acting on a piston in a cylinder so as to cause the pressure of such fluid on said piston to vary in a manner which includes a component proportional to upward and downward accelerations of the contact member and in the same sense.

Arrangements are already known in which power-operated means are applied to provide and regulate the force applied upwards to the pantograph frame and downwards on the vehicle, by which means the pantograph may be raised or lowered, but in constructions in accordance with the invention, power operation is applied directly to the contact head. Advantageously the power operation of the contact head may be provided in conjunction with power operation of the frame, in a manner that will be described.

It is desirable to regulate the force on the contact head so as to maintain continuous contact between the contact head and the overhead conductor, with a pressure that is sufficient for satisfactory conduction but not such as to cause excessive deflection of the overhead conductor, or excessive wear of the wire or contacts, the pressure having such value or varying in such a manner that undesirable oscillations of the overhead conductor are not set up, thus avoiding the consequent loss of contact or damage to the overhead system.

In order to explain the nature of the invention and its bearing on possible loss of contact it is necessary to explain how such loss of contact is liable to occur. The overhead conductor is supported from the ground, directly or indirectly, from supporting points on masts or like structures that, for reasons of cost, cannot be close together, and as a consequence the conductor sags between these supporting points, and the vertical deflection that results from a given upward contact pressure is not uniform, being usually greater near the center of the span than in the neighborhood of the supporting points; in other words, the stiffness for displacement of the conductor is not uniform. Various means are in common use, using an additional wire referred to as the catenary, by which the sag of the contact wire may be controlled and the stiffness made more uniform, but, particularly on high voltage systems, in which for reasons of cost, wires of comparatively small section are used, the overhead system is very flexible and its stiffness variable over the spans. Further, being an elastic system with associated masses, the overhead system can oscillate or vibrate in a number of different modes, and such vibrations are readily set up by the contact force as the head moves along the wire and tends to cause a deflection that varies with variations of the stiffness. The consequence of such oscillation is that the contact member or head is required to follow and maintain good contact with a contact wire that is in a state of movement up and down due in part to the sag of the wire and in part to the forces at previous times, or due to other pantographs. Since contact heads necessarily have considerable mass, and, as usually constructed, the pantograph as a whole is resilient and also liable to oscillation, it is found that the contact head does not always maintain contact, but may be said to bounce away from the wire. This is particularly liable to occur at certain speeds, at which the oscillations are built up in a manner similar to resonance. Increasing the upward pressure does not necessarily prevent such loss of contact, because it is the upward pressure that produces the deflections and oscillations, and these may be so much increased that contact is still lost.

Construction in accordance with the invention prevents, or reduces, this phenomenon of contact loss by both reducing the tendency to set up oscillations of the kinds that cause contact loss and by causing the contact head to follow such movements of the line as still occur and maintain contact with it.

Figure 5:
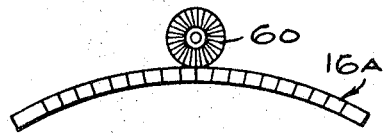
Figure 2:
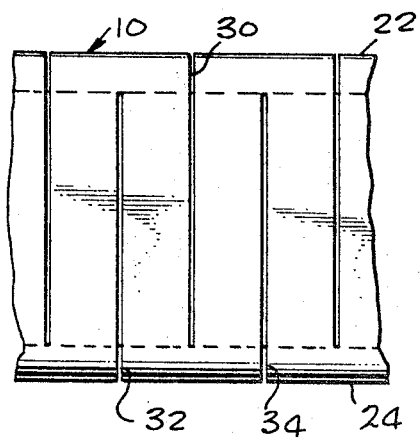
Figure 6:
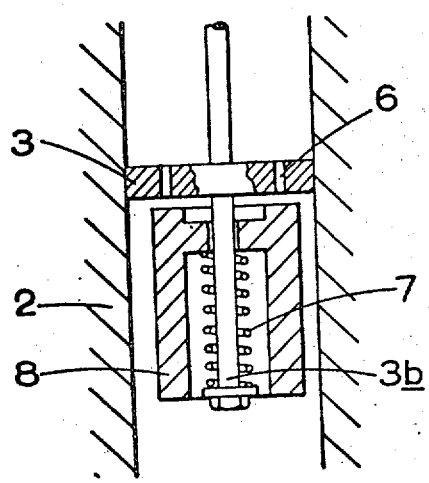
Figure 7:
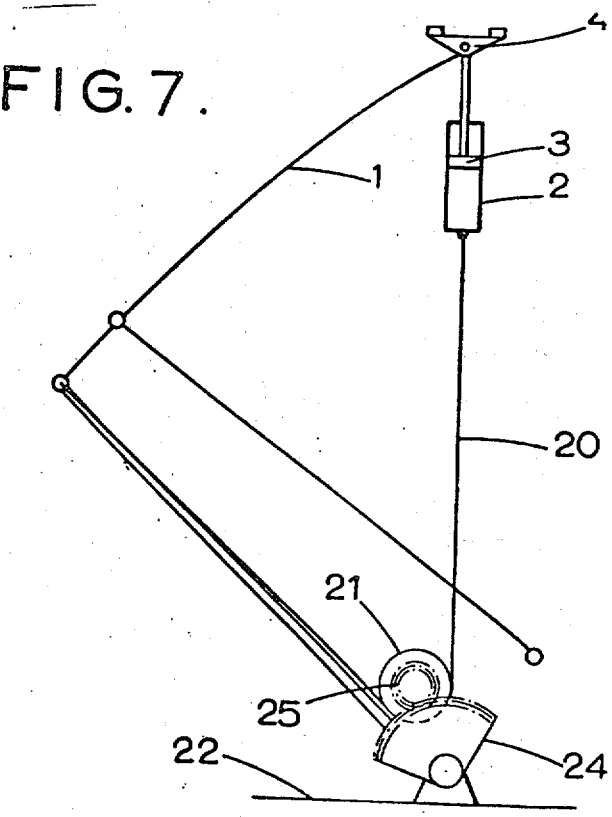

The invention will be further described by way of example with reference to the accompanying drawings, in which:

FIG. 1 is a diagrammatic view of an overhead conductor, and a contact head carried on a pantograph frame, the upper part only of which is shown in the drawing, FIG. 2 is a diagrammatic view of an auxiliary device, FIGS. 3, 4, 5 and 6 are detailed diagrammatic views of various embodiments of control cylinder for use in the apparatus of FIG. 1, FIG. 7 is a diagrammatic view of an alternative embodiment of the invention.

In the drawings 1 represents the upper part of a pantograph frame and 2 represents a cylinder carried thereby.

3 represents a piston reciprocable in a vertical direction in the cylinder 2 and having a piston rod 3a carrying at its upper and a contact head 4 having contact strips 4a, all shown diagrammatically.

The invention has for its object to maintain the contact head 4 with its contact strips in proper engagement with an overhead conductor wire 5.

Control of the force on the piston 3 in the cylinder 2, and hence of the height of the contact head 4 relative to the upper part 1 of the frame is effected through the media of a servosystem which includes a control valve 10 having an operating rod 13.

A small movement of the valve operating rod 13 downwards allows fluid from a fluid-pressure source to enter below the piston 3 and to be exhausted from above the piston. A negative feedback of pressure is provided in a known manner by a supplementary bellows or piston 14 acting on the valve rod 13 with a force, as nearly as possible proportional to the net thrust of the piston, with the combination of piston 3, valve and feedback constituting a "proportional force control" of a form which is well known in many applications and which has the effect of ensuring that the net thrust of the piston 3, up or down, is proportional to the force applied (by means described below) to the valve operating rod respectively down or up. The force in the contact head is then, very nearly, at all times equal to the force applied to the valve, multiplied by a constant factor $k$, which depends on the feedback and is nearly independent of supply pressure. In accordance with the invention the valve 10 is attached to the contact head and moves with it and a supplementary slug 8 is attached to the valve operating rod 13, of such weight that the weight $w$ of the slug 8 and the valve rod 13 together is $1/k$ times the weight $w$ of the contact head 4 and piston 3 and its rod 3a together, where $k$ is the force amplification factor already referred to.

An additional force $f$ is applied to the valve 10 by means that will be described and which in the simplest arrangement is a constant force provided by a spring.

The piston 3 will be pushed upwards, until a resistive force X is produced by contact with the contact wire 5, and the equation giving the value of this force, when the contact is moving with the wire, is $$x+w+\frac{w}{g}\ddot{y}-k\left(w+\frac{w}{g}\ddot{y}+f\right)=0$$

where $y$ is the vertical acceleration of the contact head and where the quantity in brackets is the total downward force on the valve rod 13. But, $$w+\frac{w}{g}\ddot{y}=k\left(w+\frac{w}{g}\ddot{y}\right)$$

so $X=kf$.

Thus the contact head 4 presses on the wire 5 with a force proportional to the force $f$ applied to the valve, independently of the state of motion of the wire. The inertia and weight of the contact head 4 are automatically cancelled by corresponding forces on the piston 3, and, insofar as these relations are exactly achieved, the contact head 4 behaves as though it were weightless and massless. If the force $f$ applied to the valve is a constant force the contact head will exert the constant force $X=kf$ on the line, no matter how the line may move, within the limits of piston movement provided.

This arrangement, as so far described, may in some cases be desirable as ensuring that contact cannot readily be lost, but it is not necessarily the best arrangement for all kinds of overhead line, because by maintaining a constant pressure while moving along a line of nonuniform stiffness, there may be caused rather large vertical oscillations of the overhead wire and the contact head. Not only may these, if excessive, cause damage, but they may cause conditions (such as rapidly travelling ripples in the wire due to reflections) which would impose too severe a task on the piston and feedback system for the constancy of force to be fully maintained.

One manner in which the contact force may advantageously be varied so as to reduce the tendency to set up oscillations, is to vary the force so as to compensate in whole, or in part, for the variation of stiffness of the conductor over the span. Insofar as the effective stiffness varies smoothly over the span, the corresponding deflection may then be constant, or more nearly constant, and the result is an approximation to the desirable condition that a conductor displacement of fixed form and amount travels with the contact, with large vertical oscillations of the wire being avoided. A component of the force $f$ applied to the valve, which is a suitable function of the position in the span, may be provided by making use of the fact that the overhead wire is usually carried in a zigzag manner, alternating between a displacement to one side at one support and a displacement to the other side at the next support. The position of the wire laterally, relative to the contact head, then indicates the position in the span.

For example, as shown in FIG. 2, a transverse light auxiliary contact bar 11 may be arranged, which is, in the free position, above the level 30 of the main contact, but is pressed down by the overhead wire 5 to the level 30 of the main contact at the position of the wire 5. This light contact bar 11 is attached to the contact head 4 by the two springs 31 and 32 located towards its ends. A third spring 33 at the midregion of the bar 11 provides the extra component of the force $f$ applied to the valve 10. This spring 33 gives the greatest pressure when the wire 5 is near the middle of its range of lateral displacement along bar 11, and is applied to the valve rod 13 through a lever 12 or equivalent, which reverses the direction of the force. Thus an additional component of upward force on the valve 10 is given when the wire 5 is in the middle part of its range of lateral movement, and the upward thrust of the piston 3 on the contact head 4 is smaller when the pantograph is near the middle of a span, as is required since the overhead system is less stiff in this region.

Figure 3:
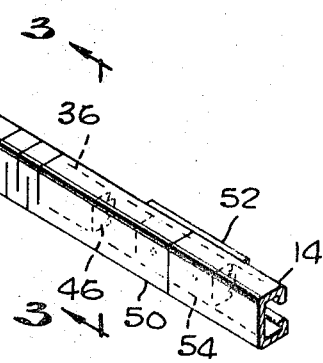

In a further and preferred embodiment of the invention now to be described, the control valve is combined with the piston and placed inside the cylinder, as indicated in FIG. 3. In this arrangement the operating cylinder 2 is fed at its lower end with a continuous inflow of fluid at an approximately constant rate from a source at high pressure, and this fluid is returned at a lower pressure from the upper end of the cylinder. The operating force is produced by the excess of pressure in the lower part of the cylinder over that in the upper part, and this difference in pressure is obtained and regulated by the throttling of the flow of fluid through holes or apertures 6 in the piston 3. This throttling is produced by the approach to the holes in the piston of suitable projections from a slug 8, above the piston, which slug is guided so as to slide in a vertical direction, and eventually to close or partially close the holes 6 in the piston 3. A more detailed representation of the region near a hole 6 is given by way of example in FIG. 4, and the degree of throttling of the fluid flow increases as the gap 40 between the piston 3 and the slug 8 is reduced. The arrangement shown ensures that a very small variation of the gap 40 varies the degree of throttling from almost complete closure of the holes 6 to almost unrestricted flow and to this end, many holes 6 each of small diameter are used. The operation depends upon the fact that, as the gap 40 is reduced, and the throttling is increased, the excess pressure below the piston 3 increases, and since an area of the surface of the slug 8 opposite to the holes 6 and in their immediate neighborhood is subjected to this excess pressure, a condition of equilibrium will be possible, for some size of the gap 40, with the forces on the slug 8 balanced.

If the upward forces on the slug 8 are $-W'$ where $W'$ is the weight of the slug, $-M'(d^2x')/dt^2$, the inertia force, and $-S$, a force due to a spring 7 above the piston. Then if $f$ is the upward force on the slug due to fluid pressure, these forces are related by:

$$f=W'+S+M'\frac{d^2x'}{dt^2}$$

where $x'$ is the vertical displacement of the slug 8 from a fixed horizontal level. The force $F$ on the piston is due to the same pressure difference as produces $f$, this pressure difference acting on the area of the piston 3, which is larger than the small area of the slug opposite the holes in some ratio $K$. The force on the piston is therefore:

$$F=Kf=K\left(W'+S+M'\frac{d^2x'}{dt^2}\right)$$

In this embodiment of our invention we make $K$ approximately equal to the ratio $M:M'$, where $M$ is the mass of the piston and the contact head taken together, and $M'$ is the mass of the slug.

The corresponding ratio of weights $W:W'$ is also $K$ and $$F=W+KS+M\frac{d^2x'}{dt^2}$$

and if the vertical acceleration of the slug 8 is equal to that of the piston 3, $$F=W+M\frac{d^2x}{dt^2}+KS$$

where $x$ is the vertical displacement of the piston 3 from a fixed horizontal level. Thus, when the relative acceleration of the slug 8 and the piston 3 is zero, the fluid forces on the piston 3 compensate for the weight and inertia forces on the contact head 4 and provide an additional upward force, pressing the head 4 against the conductor wire 5 with a force $KS$. This relationship is not dependent upon the rate of fluid flow so long as the variation in size of the gap 40 is not excessive, but limits exist because for movement in one direction the holes 6 eventually become completely closed, and for movement in the reverse direction they become virtually completely open, and further movement produces little change of force. The fluid forces on the piston 3 are correspondingly limited to upward forces up to a maximum value related to the piston area and the maximum supply pressure and a minimum which may be small but cannot be zero or negative.

In application to pantographs a range of force of this kind (limited to upward forces) may sometimes be adequate and convenient, because a principal requirement for a pantograph is to prevent the separation of the conductor wire from the pantograph contact head and the arrangement as described will prevent this, by providing the additional upward forces when required. The arrangement as so far described, being incapable of providing additional downward forces, would not reduce the excess pressures that tend to occur when the wire at the contact point is accelerated downwards relative to the vehicle. In some types of contact wire, such as the simple "-trolley"-type line, the reduction of such excess pressures may be a dominant requirement.

In such cases the construction in accordance with our invention is modified in one of the two ways which will now be described.

Figure 4:
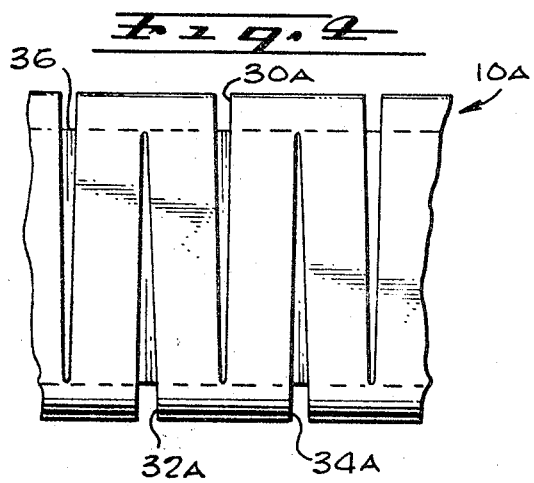
Figure 1:
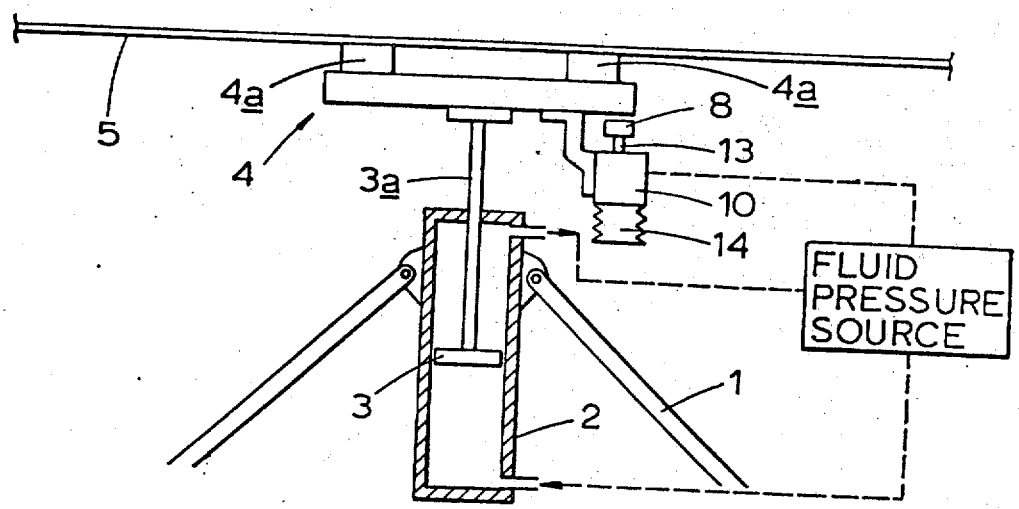
Figure 2:
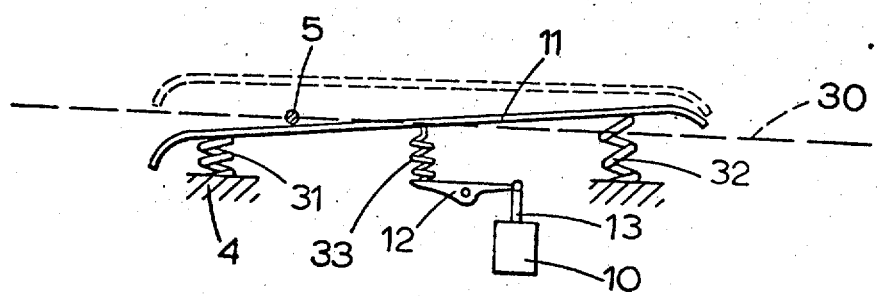

In one arrangement the operation of the piston 3 is as already described with reference to FIGS. 3 and 4, but in addition springs (not shown) are provided which give downward forces $S_h$ on the head. The range of net upward force on the head, instead of being confined to the range nil up to a maximum value of F (0 to Fmax) is confined to the range $-S_h$ to Fmax $-S_h$), and may be adapted to the requirements of a given type of line by making Fmax suitably large and selecting a suitable value of $S_h$.

In another arrangement, specially applicable when the prevention of excess upward forces is a dominant requirement, the arrangement as shown in FIG. 3 is inverted, as shown in FIG. 5, so that the fluid forces are downward forces, and springs (not shown) are included which provide an upward force $S_h$ on the head. The conditions when the piston 3 and slug 8 have the same acceleration are as previously described, except that the spring force S must now exceed W', and the downward force on the piston is $$KS - \left(W + M\frac{d^2x}{dt^2}\right) - S_h$$

and the upward force is $$S_h - KS + W + M\frac{d^2x}{dt^2}$$

So weight and inertia are compensated and the pressure on the contact is ($S_h$-KS). Since S must exceed W', KS must exceed W and $S_h$ must exceed W +P where P is the required contact force. In this arrangement the upward force is produced by the springs but reduced or reversed when required by the action of the piston, and the magnitude of the maximum downward force may be made sufficient to limit the excess pressure under the most onerous conditions that occur, as in a trolley-type line.

It has been shown that the required operation occurs if the gap 40 between the slug 8 and the piston 3 has a size appropriate to the acceleration, and that forces act on the slug that tend to bring the gap 40 to this "equilibrium" size. It is further necessary that the dynamic relationships should be such that the equilibrium condition is attained very rapidly and without undue overshoot and oscillation. As is usual in regulators that involve the displacement of parts having mass, tendencies to overshoot and oscillation are present, and in a practical construction, additional damping forces opposing variation of the size of the gap 40 are provided, to the extent found necessary by detailed calculation, by an arrangement as illustrated in FIG. 4 in which a projection 18 on the piston 3 slides into a recess 19 on the slug 8 (or the reverse) with suitable clearance so as to form a fluid damper giving forces between the slug 8 and the piston 3 opposite in sense to their relative velocities.

It may also be noted that the construction as previously described with reference to FIG. 3 has inherently the property of providing damping, because, if the piston is moving with a velocity v, the rate of flow of fluid through the holes 6 in the piston 3 is different on that account, being smaller, in FIG. 3 if the velocity is upwards. This has no effect on the equilibrium forces, but it does impose additional forces, of the nature of damping, during the periods in which equilibrium is in process of being attained, and these forces are found to assist stability.

FIG. 6 shows a system substantially similar to that described with reference to FIGS. 3 and 5, the main difference being that the spring 7 acts between the slug and a rod 3b attached to the piston 3, rather than between the slug and an end of the cylinder.

This is particularly advantageous if the stroke of the piston is long, as the force exerted by the spring 7 will be independent of the position of the piston 3 in its stroke.

In a pantograph arrangement in which springs are provided between the head and the frame acting in parallel with a servosystem such as is described above, if these springs have a "rate" (or force per unit change of length) of value R, there is caused a variation of contact force of R.d, where d is the reduction of the distance between the head and the frame. This force is transmitted to the frame and, if the frame is not too massive, causes movements of the frame that suffice to avoid the piston 3 reaching the upper or lower limits of its stroke in cylinder 2. For example, if the vehicle enters a stretch of track where the conductor wire slopes downwards, as on the approach to a tunnel, the contact point has a corresponding downward velocity. Initially this results in a downward movement of the head only, but this is followed in an additional and increasing downward force on the frame because of the springs and the frame itself will be lowered. It may be arranged that for the conditions that occur in practice at operation, this movement is such as to ensure that the piston 3 will not reach the limits of its stroke in the cylinder 2, either upwards or downwards. In this case power means for continually adjusting the height of the frame is unnecessary.

If, however, such power operation of the pantograph frame is provided, together with suitable control means, the operation of these control means in accordance with the relative displacement of the head from the frame may conveniently be arranged by locating the control means near to the power operating device at the base of the pantograph frame, and operating this control means through a mechanical connection, such as a Bowden wire or an equivalent.

Since the pantograph frame is relatively massive, and comparatively large movements are required, it is inconvenient to cause it to contribute significantly to the movements of the contact head of the higher frequencies. In constructions in accordance with the invention it is sufficient to arrange that the pantograph frame is given an upward or a downward velocity in dependence upon whether the contact head is raised, relative to the top of the pantograph frame, by more or less than a predetermined distance. This would ensure that any tendency for the piston operating the contact head to be on the average more towards its upper limit is rapidly removed by an upward movement of the frame, and the reverse for the lower limit. With this arrangement movements of the top of the frame are relatively slow, and the top of the frame, so far as the higher frequency movements of the contact head are concerned, may be regarded as approximately stationary, which enables it to be used, as already mentioned, as a fixed point with reference to which damping may be introduced.

Since the fluid servomechanism produces a fluid pressure differential which is proportional to the acceleration of the head, together with a constant component; then a corresponding force, also proportional to the acceleration of the head together with a constant component, and of any desired magnitude, may be applied at any desired point of the frame by applying the said fluid pressure differential to a suitably located piston and cylinder, without any additional throttling or controlling device, so assisting in achieving the purposes of the invention by contributing to the acceleration of the frame.

In one particularly simple form of application of the invention the spring usually provided between the head and the frame is not used, that is, the head is connected to the frame in a relatively stiff manner, without intervening resilience. In this case the servo is suitably dimensioned to compensate to a desired extent for the combined inertia of the head and the frame.

A further alternative mode of application of the servo cylinder, using the "inverted" form described above with reference to FIGS. 5 and 6 is depicted diagrammatically in FIG. 7.

The purpose is to avoid the necessity for carrying the servo cylinder on a relatively rigid extension of the frame. Instead, the cylinder 2 is restrained by a flexible wire 20 always in tension, which connects the cylinder to a winding spool 21 on the base 22, so arranged with gear segment 24 engaging pinion 25 that as the pantograph is lowered, the cylinder 2 is pulled down and remains in more or less constant relationship to the head.

The pantograph frame 1 can then be light, and flexible for vertical displacements of the head 4. The head is pressed upwards against the conductor wire by spring force from the frame, less the downward force exerted by the servosystem, which varies in the manner described so that the inertia forces in the head are compensated.

It will be understood that in carrying out the invention, in cases in which the power supply is at high voltage, the servo cylinder and associated parts will necessarily be at a high voltage, and if the source of fluid (such as a pump and reservoir) are at a different voltage, then the pipes and fluid must have suitable insulating properties. Alternatively, the source of fluid may be at the line potential and the pump driven through an insulating shaft.

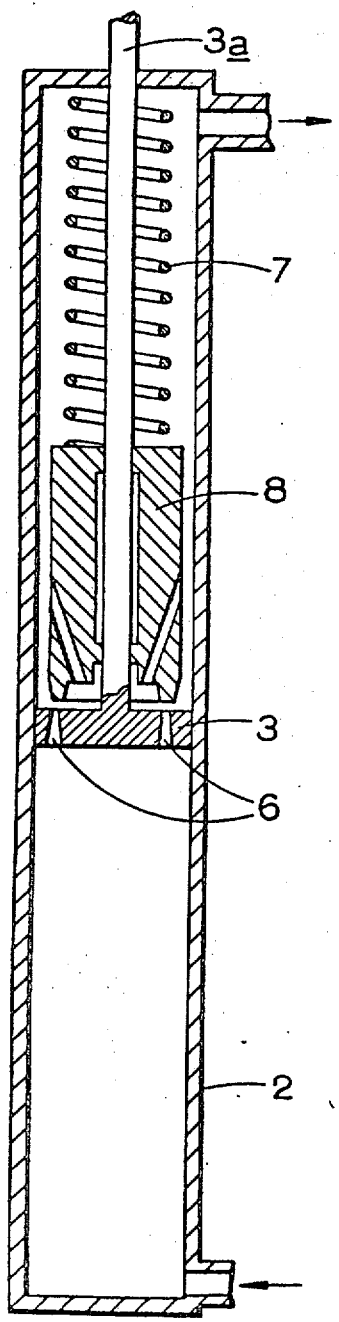
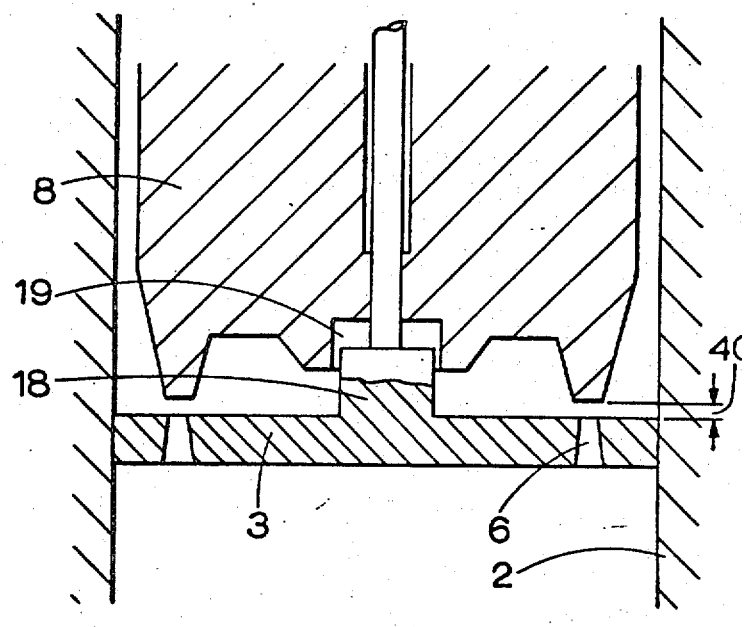
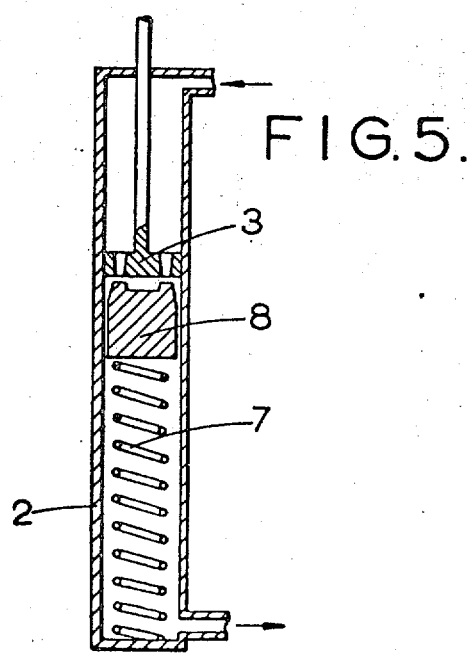

I claim:

1. A current collection installation for supplying electric current to a vehicle on a track from a conductor extending along the track comprising a contact head adapted to bear in conductive engagement against the conductor, the contact head being carried on a frame mounted on the vehicle, including a servosystem providing compensation for the inertia of the contact head, so as to tend to maintain said head in continuous conductive engagement with the conductor without variations of the force applied by the head to the conductor, the servosystem including, a piston reciprocable in a cylinder, the cylinder being mounted on the frame and the piston connected to move with the contact head, valving means for effecting variation of the pressure of a fluid acting on said piston, said means being controlled by the displacement relative to the contact head of a slug operatively associated with the head, such relative displacement taking place due to the inertia of the slug, whereby the pressure of said fluid on said piston includes a component proportional to the acceleration of the contact head towards or away from the conductor.

2. An installation according to claim 1, wherein said valving means includes a control valve carried by the contact head, said control valve having valve ports, said slug being operatively associated with the control valve, and said control valve having means including the inertia of the slug to control flow through the valve ports, so as to effect corresponding variations of the fluid pressure acting on the piston.

3. An installation according to claim 1, wherein the valving means includes a fluid valve operable by forces derived from the inertia of said slug and adapted to vary the difference of pressure on opposite sides of said piston, and a feedback system having means for effecting a negative feedback force on the valve proportional to the said difference of pressure.

4. An installation according to claim 3 in which the feedback has a constant of proportionality such that the fluid force on the piston is maintained in a ratio to the inertia force on the slug approximately in the ratio of the mass of the head and piston to the mass of the slug and the parts of the valve moving with it.

5. An installation according to claim 1, wherein the piston has holes therethrough and said slug has means including the inertia of the slug to control fluid flow through said holes in the piston, and wherein fluid flows through said holes between inlet and outlet ports in the cylinder on opposite sides of the piston.

6. An installation as in claim 5, wherein the slug of said servosystem is carried within said cylinder and in which displacement of the slug relative to the piston due to inertia forces varies the degree to which said holes are obturated so as to vary the difference in pressure on opposite sides of the piston and in which said variation in difference of pressure produces a feedback force on the slug.

7. An installation as in claim 6 in which the ratio of the force corresponding with said difference of pressure on the opposite sides of the piston to the force on the slug is substantially equal to the ratio of the mass of the head and the piston to the mass of the slug.

8. An installation according to claim 1 including damping means resisting high frequency oscillatory movements of the slug relative to the head.

9. An installation according to claim 1 wherein the conductor is an overhead wire extending above a track and the frame is an extensible pantograph and wherein the contact head mounted on the frame is arranged for vertical movement relative thereto under control of the servosystem.

10. An installation according to claim 1 wherein means are provided for moving the frame in dependence on the displacement of the piston towards one end or the other of the cylinder and in the same direction as such displacement to tend to prevent the piston reaching one of the ends of the cylinder carried by the frame.

11. An installation according to claim 9 including auxiliary control means for varying the upward force exerted by the contact head on the conductor so that the force is at a minimum when the contact head bears on a part of the conductor which is in the midregion of its span between suspension points and is at a higher value at other regions of such span.

UNITED STATES PATENT OFFICE
CERTIFICATE OF CORRECTION

Patent No. 3,576,957      Dated May 4, 1971

Inventor(s) Arnold Tustin

It is certified that error appears in the above-identified patent and that said Letters Patent are hereby corrected as shown below:

Sheet 1 and sheet 2 of the drawing should be canceled and the 3 sheets, attached hereto, substituted therefor; the illustrative drawing on the cover sheet should be canceled and the drawing shown below substituted therefor:

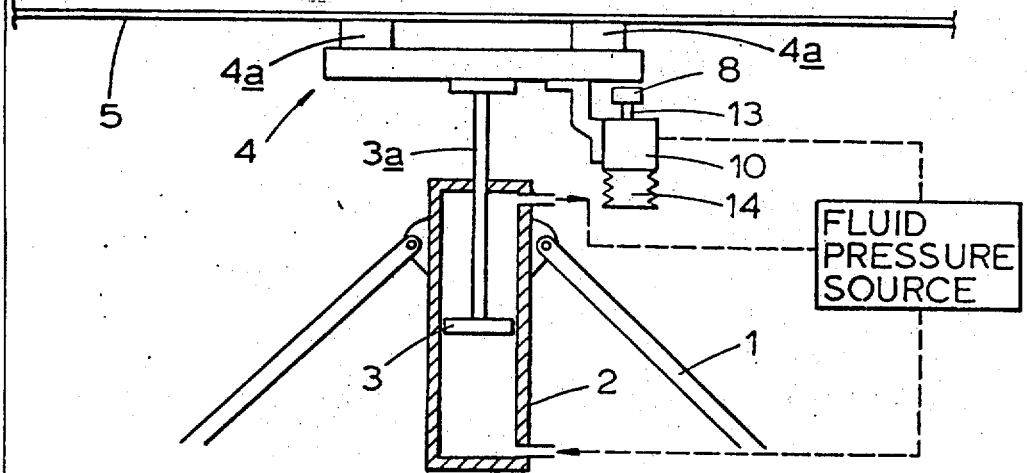

Signed and sealed this 10th day of October 1972.

(SEAL)
Attest:

EDWARD M. FLETCHER, JR.
Attesting Officer

ROBERT GOTTSCHALK
Commissioner of Patents